United States Patent
Kataoka et al.

[11] Patent Number: 5,826,459
[45] Date of Patent: Oct. 27, 1998

[54] REMAINING FUEL AMOUNT MEASURING APPARATUS FOR A FUEL TANK

[75] Inventors: Ichiro Kataoka; Shinji Narama, both of Shizuoka, Japan

[73] Assignee: Yazaki Corporation, Tokyo, Japan

[21] Appl. No.: 833,050

[22] Filed: Apr. 3, 1997

[30] Foreign Application Priority Data

Apr. 19, 1996 [JP] Japan ................................. 8-098503

[51] Int. Cl.⁶ ................................................. G01F 23/30
[52] U.S. Cl. ...................... 73/290 R; 73/1.73; 73/113; 73/305; 73/312
[58] Field of Search ........................ 73/1.73, 113, 290 R, 73/305, 308, 309, 312, 313, 314

[56] References Cited

U.S. PATENT DOCUMENTS

| | | | |
|---|---|---|---|
| 4,402,048 | 8/1983 | Tsuchida et al. .......................... | 73/113 |
| 4,611,287 | 9/1986 | Kobayashi et al. ..................... | 73/304 C |
| 4,782,699 | 11/1988 | Gonze ........................................ | 73/313 |
| 4,890,491 | 1/1990 | Vetter et al. ............................... | 73/313 |
| 4,912,646 | 3/1990 | Cerruti ....................................... | 73/308 |
| 4,967,181 | 10/1990 | Iizuka et al. ........................... | 73/290 R |
| 5,495,745 | 3/1996 | Hughes ..................................... | 73/1.73 |

*Primary Examiner*—Ronald L. Biegel
*Assistant Examiner*—Eric S. McCall
*Attorney, Agent, or Firm*—Sughrue, Mion, Zinn, Macpeak & Seas, PLLC

[57] ABSTRACT

In a remaining fuel amount measuring apparatus, a CPU captures remaining fuel amount data detected by a fuel sender unit at prescribed periods through a voltage conversion circuit and A/D conversion circuit, compiles the captured remaining fuel amount data into blocks each composed of a prescribed number of data samples to be successively stored in a RAM. The CPU reads the block data as necessary and subjects the read data to data processing such as simple averaging, weighted averaging or removal of abnormal values. The CPU displays the remaining fuel amount after the data processing on a fuel meter.

7 Claims, 8 Drawing Sheets

CONDITION SETTING 1

|  | NUMBER OF TIMES n1 OF WEIGHTED AVERAGE | NUMBER OF TIMES OF FILTER AVERAGE |
| --- | --- | --- |
| DISPERSION: LARGE | LARGE | LARGE |
| DISPERSION: SMALL | SMALL | SMALL |

CONDITION SETTING 2

|  | UPPER LIMIT Fh OF FILTER COEFFICIENT | LOWER LIMIT Fl OF FILTER COEFFICIENT |
| --- | --- | --- |
| MONOTONOUS INCREASE | LARGE | SMALL |
| MONOTONOUS DECREASE | SMALL | LARGE | ic engine includes a fuel tank for storing fuel to be # REMAINING FUEL AMOUNT MEASURING APPARATUS FOR A FUEL TANK

BACKGROUND OF THE INVENTION

The present invention relates to a fuel tank for storing fuel for a motor vehicle equipped with an internal combustion engine, and more particularly to a remaining fuel amount measuring apparatus for a fuel tank, which is capable of measuring the amount of fuel remaining in the fuel tank with high accuracy.

For example, the motor vehicle equipped with an internal combustion engine includes a fuel tank for storing fuel to be supplied to the internal combustion engine. The fuel tank generally provided with an apparatus for measuring the amount of fuel remaining in the tank.

As an example of a conventional remaining fuel amount measuring apparatus, a fuel tank attached to a motor vehicle is provided with a fuel sender unit for measuring the amount of fuel remaining in the fuel tank. The fuel sender unit includes a float provided within the fuel tank, a float arm rotatably supporting the float on a fulcrum of an arm shaft, a wiring resistor, and a contact arm coupled with the float arm and sliding on the wiring resistor at the fulcrum of the arm shaft. In this structure, when the height of the face of the fuel liquid changes because of supply or consumption of fuel, the contact point of the contact arm of the wiring resistor is shifted in accordance with a change in the height of the liquid fuel face. Correspondingly, the electric resistance of the wiring resistor varies. Thus, the height of the fuel liquid face, i.e., remaining fuel amount can be detected by converting the electric resistance into a voltage value. The remaining fuel amount thus detected is displayed on a fuel meter located in a vehicle chamber so that a driver can know the remaining fuel amount by an indication on the fuel meter, and supplies fuel before the fuel lever becomes zero.

However, the above conventional remaining fuel amount measuring apparatus has a problem that the remaining fuel amount may be erroneously displayed on the fuel meter because of a change in the posture of a vehicle due to acceleration/deceleration and vibration of the vehicle, tilt of road, etc.

The reason is as follows. The face of fuel liquid contained in the fuel tank greatly swings in response to the change in the vehicle posture. This is attended with the vertical movement of the float. Accordingly, the electric resistance of the wiring resistor indicative of the liquid level changes.

In order to obviate such an inconvenience, some techniques of removing the measuring error for the remaining fuel amount have been proposed which include provision of a silicone damper with high viscosity at an indicator driving section of the fuel meter and successively integrating the input electric resistance in converting the electric resistance into a remaining fuel amount so that the integrated value is averaged in a certain time to acquire the remaining fuel amount.

However, the former technique, i.e. stabilizing the needle of fuel meter using the silicon damper gives rise to a new problem of impairing the response of the indicator of the fuel meter because it takes a time for the indicator of the meter to indicate a correct value in fuel supply. The latter technique of time-averaging the integrated value of the electric resistance to acquire the remaining fuel amount is also problematic. If the time width of integrating the electric resistance is made short, the measurement error for the remaining fuel amount occurs owing to the change in the posture of a motor vehicle. Oh the other hand, if the time width of integration is made long, when the amount of fuel consumption per hour is high (e.g. while running on a superhighway), the remaining fuel amount varies negligibly abruptly during the above time width, thus leading the measuring error for the remaining fuel amount. Accordingly, in the latter technique also, it was difficult to remove the measuring error of the remaining fuel amount. Under such a circumstance, development of a new technique which can suppress the measuring error of the remaining fuel amount and measure the remaining fuel amount in the fuel tank with high accuracy, has been eagerly demanded.

SUMMARY OF THE INVENTION

The present invention has been accomplished in view of the above circumstance and intends to provide a remaining fuel amount measuring apparatus which captures detected data relative to a remaining fuel amount in each of predetermined periods, compiles a prescribed number of the remaining fuel amount data thus captured as each of blocks to be successively stored, subjects the block data to data processing such as weighted averaging or removal of abnormal values to suppress the measuring error of a remaining fuel amount, thus measuring the remaining fuel amount in the fuel tank with high accuracy.

In order to solve the above problem, a remaining fuel amount measuring apparatus according to the invention of a first aspect comprises detecting means for detecting the amount of fuel remaining in a fuel tank to output remaining fuel amount data; block data storage means for capturing the remaining fuel amount data outputted from said detecting means at prescribed periods and compiling the captured remaining fuel amount data into blocks each composed of prescribed number of data to be successively stored; simple average computing means for computing the simple average for each block on the basis of the block data stored in said block data storage means; weighted average computing means for computing a weighted average by further averaging the simple averages of a plurality of blocks on the basis of the simple average for the newest block and that for a past block computed by said simple average computing means; and remaining fuel amount outputting means for converting the weighted average computed by said weighted average computing means into a remaining fuel amount to be outputted.

In accordance with the invention of the first aspect, the detecting means detects the amount of fuel remaining in the fuel tank to output the remaining fuel amount data. In response to this, the block data storage means captures the remaining fuel amount data outputted from said detecting means at prescribed periods and compiles the captured remaining fuel amount data into blocks each composed of a prescribed number of data to be successively stored. The simple average computing means computes the simple average for each block on the basis of the block data stored in said block data storage means. Further, the weighted average computing means computes a weighted average by further averaging the simple averages of a plurality of blocks on the basis of the simple average for the newest block and that for a past block computed by said simple average computing means. Finally, the remaining fuel amount outputting means converts the weighted average computed by said weighted average computing means into a remaining fuel amount to be outputted. In this way, since the weighted average acquired by further averaging the simple averages of a plurality of blocks inclusive of the newest block and a past block is converted into a remaining fuel amount to be outputted, even when a case occurs where acceleration is applied to the fuel tank to swing the face of a fuel liquid, the remaining fuel amount data subjected to averaging twice is converged into a value representative of the actual remaining fuel amount. As a result, the measuring error of the remaining fuel amount can be greatly suppressed to permit the remaining fuel amount remaining in the fuel tank to be measured with high accuracy.

A remaining fuel amount measuring apparatus according to the invention of a second aspect further comprises abnormal value range computing means for computing the range excluding abnormal value data from said captured remaining fuel amount data on the basis of past remaining fuel amount data; and abnormal value removing means for removing the abnormal data from each block data stored in said block data storage means on the basis of the range computed by said abnormal value range computing means; wherein said simple average computing means computes the simple average for each block on the basis of each block data with the abnormal value data removed by said abnormal value removing means.

In accordance with the invention of the second aspect, the abnormal value range computing means computes the range to exclude abnormal value data from said captured remaining fuel amount data based on the past remaining fuel amount data. In response to this, the abnormal value removing means removes the abnormal data from each block data stored in said block data storage means on the basis of the range computed by said abnormal value range computing means. Therefore, said simple average computing means computes the simple average for each block on the basis of each block data with the abnormal value data removed by said abnormal value removing means. Further, the weighted average acquired in the same manner as in the first aspect is converted into a remaining fuel amount to be outputted. In this way, since the remaining fuel amount data are subjected to the data processing of simple averaging and weighted averaging, the remaining fuel amount can be acquired with higher accuracy than in the invention of the first aspect.

A remaining fuel amount measuring apparatus according to the invention of a third aspect comprises detecting means for detecting the amount of fuel remaining in a fuel tank to output remaining fuel amount data; block data storage means for capturing the remaining fuel amount data outputted from said detecting means at prescribed periods and compiling the captured remaining fuel amount data into blocks each composed of a prescribed number of data to be successively stored; abnormal value range computing means for computing the range to exclude abnormal value data from said captured remaining fuel amount data on the basis of the past remaining fuel amount data; abnormal value removing means for removing the abnormal data from each block data stored in said block data storage means on the basis of the rage computed by said abnormal value range computing means; simple average computing means for computing the simple average for each block on the basis of each block data with the abnormal value data removed by said abnormal value removing means; and remaining fuel amount outputting means for converting the simple average for the newest block computed by said simple average computing means into a remaining fuel amount to be outputted.

In accordance with the invention of the third aspect, the detecting means detects the amount of fuel remaining in a fuel tank to output remaining fuel amount data. In response to this, the block data storage means captures the remaining fuel amount data outputted from said detecting means at prescribed periods and compiles the captured remaining fuel amount data into blocks each composed of prescribed number of data to be successively stored. On the other hand, the abnormal value range computing means computes the range to exclude abnormal value data from said captured remaining fuel amount data on the basis of the past remaining fuel amount data. In response to this, the abnormal value removing means removes the abnormal data from each block data stored in said block data storage means on the basis of the range computed by said abnormal value range computing means. Therefore, the simple average computing means computes the simple average for each block on the basis of each block data with the abnormal value data removed by said abnormal value removing means. The remaining fuel amount outputting means converts the simple average for the newest block computed by said simple average computing means into a remaining fuel amount to be outputted. In this way, since the remaining fuel amount data are subjected to the data processing of simple averaging on the basis of the data with the abnormal data excluded from each block data and the simple average for the newest block is converted into a remaining fuel amount to be outputted, even when a case occurs where acceleration is applied to the fuel tank to swing the face of a fuel liquid, the remaining fuel amount data acquired by simple averaging of the data with the abnormal data excluded, without being subjected to weighted averaging, is converged into a value representative of the actual remaining fuel amount. As a result, the measuring error of the remaining fuel amount can be greatly suppressed to permit the remaining fuel amount remaining in the fuel tank to be measured with high accuracy.

A remaining fuel amount measuring apparatus according to the invention of a fourth aspect further comprises variation tendency computing means for computing a variation tendency among a plurality of blocks on the basis of the simple average for the newest block and that for a past block computed by said simple average computing means, wherein said abnormal range computing means computes the range to exclude the abnormal value data from said captured remaining fuel amount on the basis of the variation tendency computed by said variation tendency computing means.

In accordance with the invention of the fourth aspect, the variation tendency computing means computes a variation tendency among a plurality of blocks on the basis of the simple average for the newest block and that for a past block computed by said simple average computing means. In response to this, said abnormal range computing means computes the range to exclude the abnormal value data from said captured remaining fuel amount on the basis of the variation tendency computed by said variation tendency computing means. Specifically, for example, when the variation tendency computing means computes that the simple average representative of the remaining fuel amount has a tendency of monotonous increase, the abnormal range computing means decides, for example, that a vehicle is running on a rising slope, thereby setting the upper limit of the range excluding the abnormal data for a larger value than usual. On the other hand, when the variation tendency computing means computes that the simple average representative of the remaining fuel amount has a tendency of monotonous decrease, the abnormal range computing means decides, for example, that the vehicle is running on a falling slope, thereby setting the lower limit of the range to exclude the abnormal data for a larger value than usual. In this way, since the range adapted to the inclined state of the fuel tank can be set so as to permit unbalance in the remaining fuel amount data when the fuel tank inclines, the extreme reduction in the number of the remaining fuel amount data with the abnormal data excluded which are used in acquiring the simple average or weighted average, owing to accidental inclination of the fuel tank, can be prevented. As result, a case can be avoided where the remaining fuel amount cannot be measured owing to extreme reduction in the number of remaining fuel amount data is reduced, thereby acquiring the stabilized remaining fuel amount successively.

A remaining fuel amount measuring apparatus according to the invention of a fifth aspect comprises detecting means for detecting the amount of fuel remaining in a fuel tank to output remaining fuel amount data; block data storage means for capturing the remaining fuel amount data outputted from said detecting means at prescribed periods and compiling the captured remaining fuel amount data into blocks each composed of prescribed number of data to be successively stored; simple average computing means for computing the simple average for each block on the basis of the block data stored in said block data storage means; dispersion computing means for computing the dispersion of the newest block data on the basis of the newest block data stored in said block data storage means; number-of-times computing means for computing the number-of-times of the weighted average which constitutes a parameter of the weighted average by further averaging the simple averages of a plurality of blocks on the basis of the dispersion of the newest block computed by the dispersion computing means; weighted average computing means for computing a weighted average with the parameter of the number-of-times computed by said number-of-times computing means, on the basis of the simple average for the newest block and that for a past block computed by said simple average computing means; and remaining fuel amount outputting means for converting the weighted average computed by said weighted average computing means into a remaining fuel amount to be outputted.

In accordance with the invention of the fifth aspect, the detecting means detects the amount of fuel remaining in a fuel tank to output remaining fuel amount data. In response to this, the block data storage means for capturing the remaining fuel amount data outputted from said detecting means at prescribed periods and compiles the captured remaining fuel amount data into blocks each composed of prescribed number of data to be successively stored. The simple average computing means computes the simple average for each block on the basis of the block data stored in said block data storage means. The dispersion computing means for computes the dispersion of the newest block data on the basis of the newest block data stored in said block data storage means. In response to this, the number-of-times computing means computes the number-of-times of the weighted average which constitutes a parameter of the weighted average by further averaging the simple averages of a plurality of blocks on the basis of the dispersion of the newest block computed by the dispersion computing means. Specifically, the number-of-times computing means computes the number of times of the weighted average so as to set it for a large value if the dispersion of the remaining fuel amount data is large, i.e., the liquid face of fuel swings unstably, and computes the number of times of weighted averaging so as to set it for a small value if the dispersion of the remaining fuel amount data is small, i.e., the liquid face of fuel is stable. The weighted average computing means computes a weighted average with the parameter of the number-of-times computed by said number-of-times computing means, on the basis of the simple average for the newest block and that for a past block computed by said simple average computing means. The remaining fuel amount outputting means converts the weighted average computed by said weighted average computing means into a remaining fuel amount to be outputted.

In this way, using the number of times computed on the basis of the dispersion of the dispersion of the newest block data, i.e., setting it for a large value if the dispersion of the remaining fuel amount data is large, i.e., the liquid face of fuel swings unstably, and setting it for a small value if the dispersion of the remaining fuel amount data is small, i.e., the liquid face of fuel is stable, the weighted average of the remaining fuel amount data having a time width suitably adjusted to correspond to the state of the liquid face. Namely, if the fuel liquid face swings unstably, the remaining fuel amount is acquired on the basis of the remaining fuel amount data during a relatively long time width, and if the fuel liquid face is stable, the remaining fuel amount is acquired on the basis of the remaining fuel amount data during a relatively short time width. Thus, the remaining fuel amount acquired is swiftly converged into a value correctly representing an actual remaining fuel amount. As a result, the measuring error of the remaining fuel amount can be greatly suppressed to permit the remaining fuel amount remaining in the fuel tank to be measured with high accuracy.

DETAILED DESCRIPTION OF THE INVENTION

Figure 1:
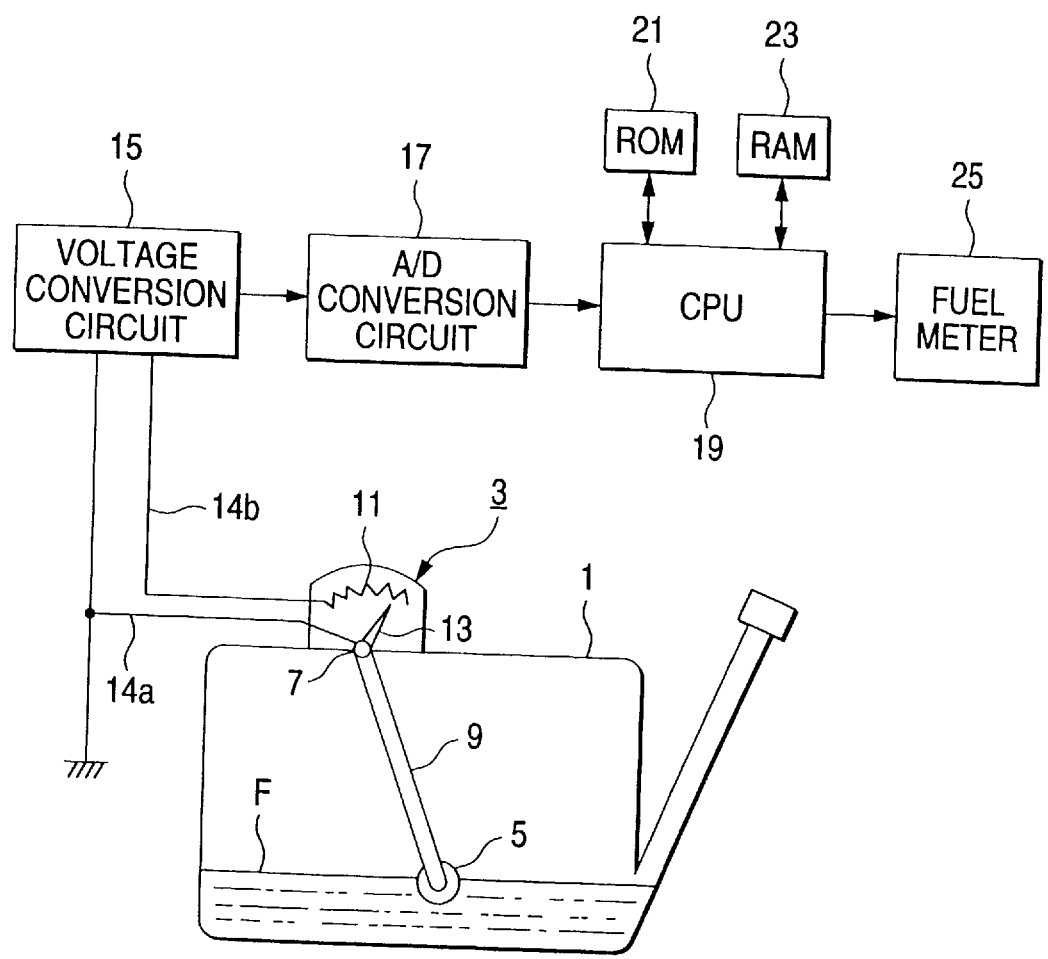
FIG. 1 is a schematic diagram showing a remaining fuel amount measuring apparatus according to the present invention.

Now referring to the drawings, preferred embodiments of a remaining fuel amount measuring apparatus for a fuel tank according to the present invention will be described.

Figure 8:
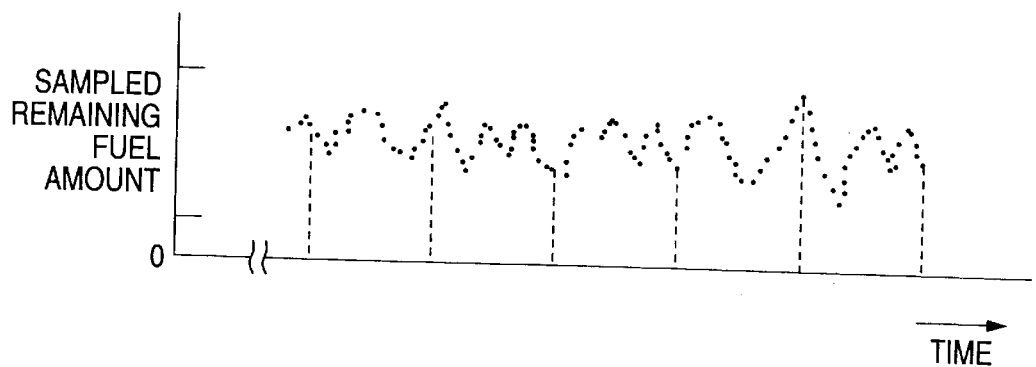
FIG. 8 is a view used for explanation of the present invention.
Figure 9:
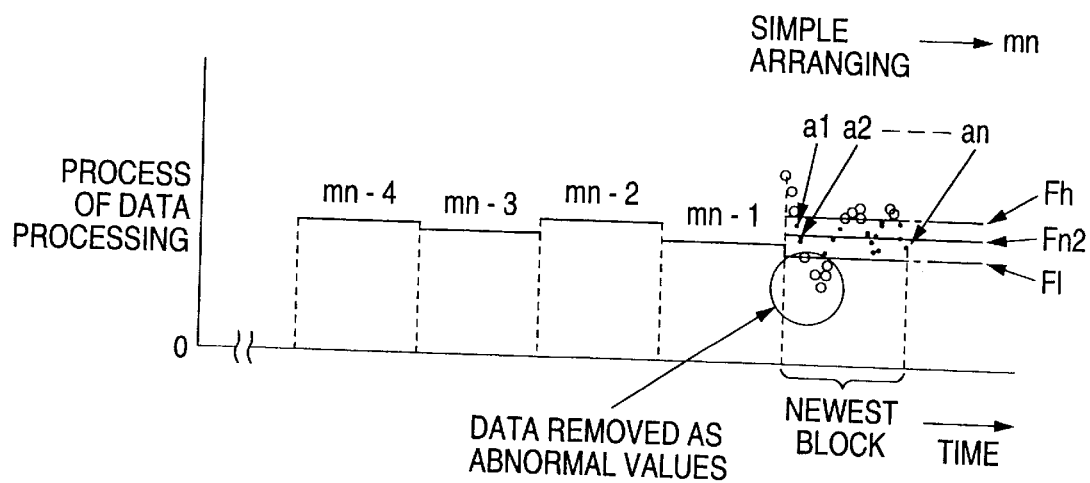
FIG. 9 is a view used for explanation of the present invention.

FIG. 1 is a schematic diagram showing a remaining fuel amount measuring apparatus according to the present invention. FIGS. 2 to 7 are operation flowcharts of the present invention. FIGS. 8 and 9 are views for explaining the operation of the present invention.

An embodiment of the fuel tank according to the present invention will be explained with reference to the fuel tank of a motor vehicle equipped with an internal combustion engine.

As shown in FIG. 1, a fuel tank 1 located below a rear passenger seat or the like of a motor vehicle is provided with a fuel sender unit 3 for measuring the remaining fuel amount in the fuel tank 1. The fuel sender unit 3 includes a float positioned so as to float on the face of fuel liquid F remaining within the fuel tank 1, a float arm 9 rotatably supporting the float at a fulcrum of an arm shaft 7, a wiring resistor 11, and a conductive contact arm 13 coupled with the float arm 9 and sliding on the wiring resistor 11 at the fulcrum of the arm shaft 7.

The contact arm 13 is grounded through a conductive wire 14a, whereas one end of the wiring resistor 11 is connected, through a conductive wire 14b, to a voltage converting circuit 15 for converting an electric resistance corresponding to the contact position of the contact arm 13 on the wiring resistor 11 into a voltage. The fuel sender unit 3 detects the position of the face of fuel liquid F, i.e. remaining fuel amount in the form of electric resistance. The voltage converter circuit 15 converts the electric resistance thus detected into a voltage value to be produced as remaining fuel amount data.

The voltage converter circuit 15 is connected to an A/D converter circuit 17 for converting the remaining fuel amount data in an analog form into data in a digital form. The A/D converter circuit 17 is connected to CPU 19. The CPU 19 receives the remaining fuel amount data sent from the A/D converter circuit 17. As described later in detail, the CPU 19 successively receives remaining fuel amount data sampled at each of predetermined periods, and makes successively a prescribed number of remaining fuel amount data stored as a block. The CPU 14 executes processing of an abnormal value by adopting an abnormal value filter set on the basis of the past remaining fuel amount data to remove the remaining fuel amount data regarded as abnormal values from the remaining fuel amount data in each of the blocks; processing of outputting a remaining fuel amount by acquiring an average (hereinafter referred to as a simple average) of the remaining fuel amount data in each of plural blocks, acquiring an average (hereinafter referred as a weighted average) of the respective averages in the blocks and outputting the weighted average as the remaining fuel amount; processing of number-of-times computing by acquiring dispersion of the remaining fuel amount data in a newest block and on the basis of the dispersed data thus acquired, computing the number of blocks (hereinafter referred to as the number of times of the weighted average) used as a parameter in acquiring the weighted average and the number of blocks (hereinafter referred to as the number of times of the filter center value) used as a parameter in acquiring the center value of the abnormal value filter; and processing of filter setting by acquiring a variation tendency of the remaining fuel amount by referring to the simple average of the newest block and that of the past plural blocks and setting the upper limit and lower limit of the abnormal value filter to suitable values on the basis of the variation tendency of the remaining fuel amount thus acquired.

The CPU 19 is connected to a ROM 21 for storing a processing program; a RAM 23 for storing a conversion map used in converting several kinds of data transferred from the CPU 19 and remaining fuel amount data in a digital form transferred from the A/D converter circuit 17 into a volume of fuel F, i.e., remaining fuel amount, and a fuel meter 25 for indicating the remaining fuel amount transferred from the CPU 19. Thus, the remaining fuel amount transferred from the CPU 19 is displayed on the fuel meter 25 so that the driver and passenger are notified of it.

Now referring to FIGS. 2 to 9, the operation of the remaining fuel amount measuring apparatus according to the present invention will be described in detail. For easy understanding of the present invention, the schematic operation of the present invention will be first explained, and the detailed operation thereof will be thereafter explained successively.

Figure 2:
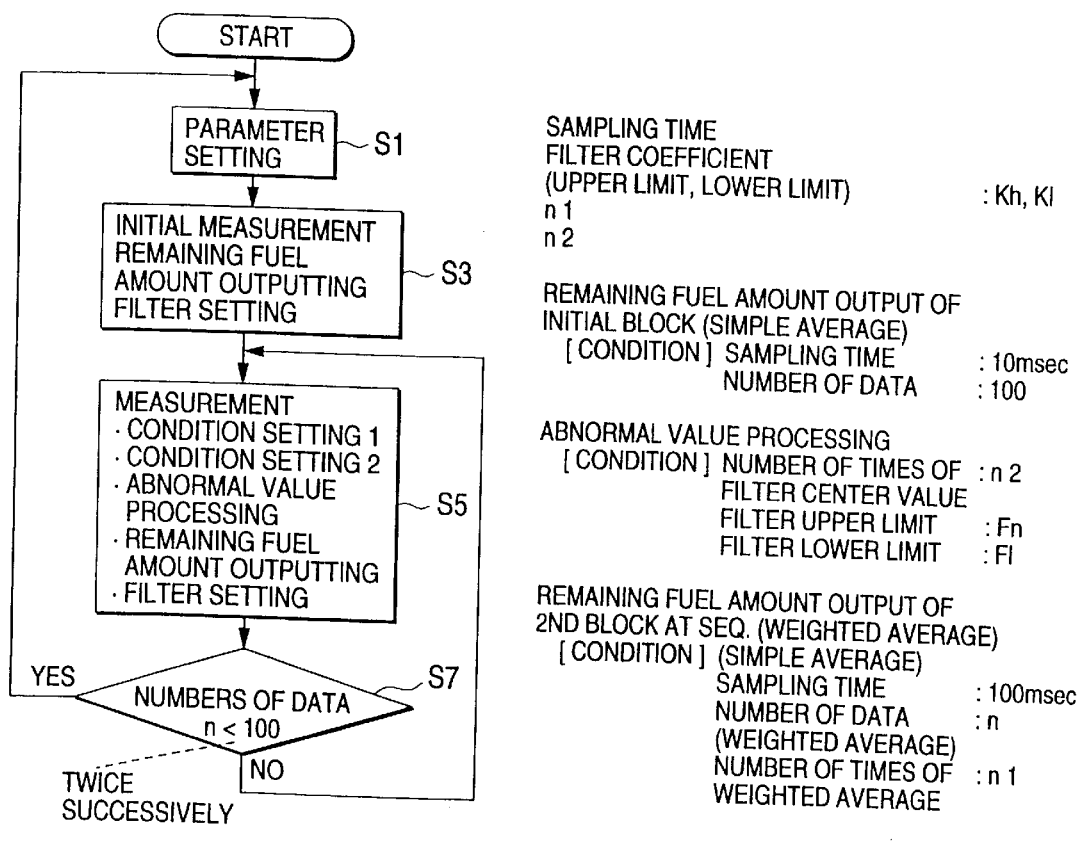
FIG. 2 is a flowchart showing the schematic operation of the present invention.
Figure 3:
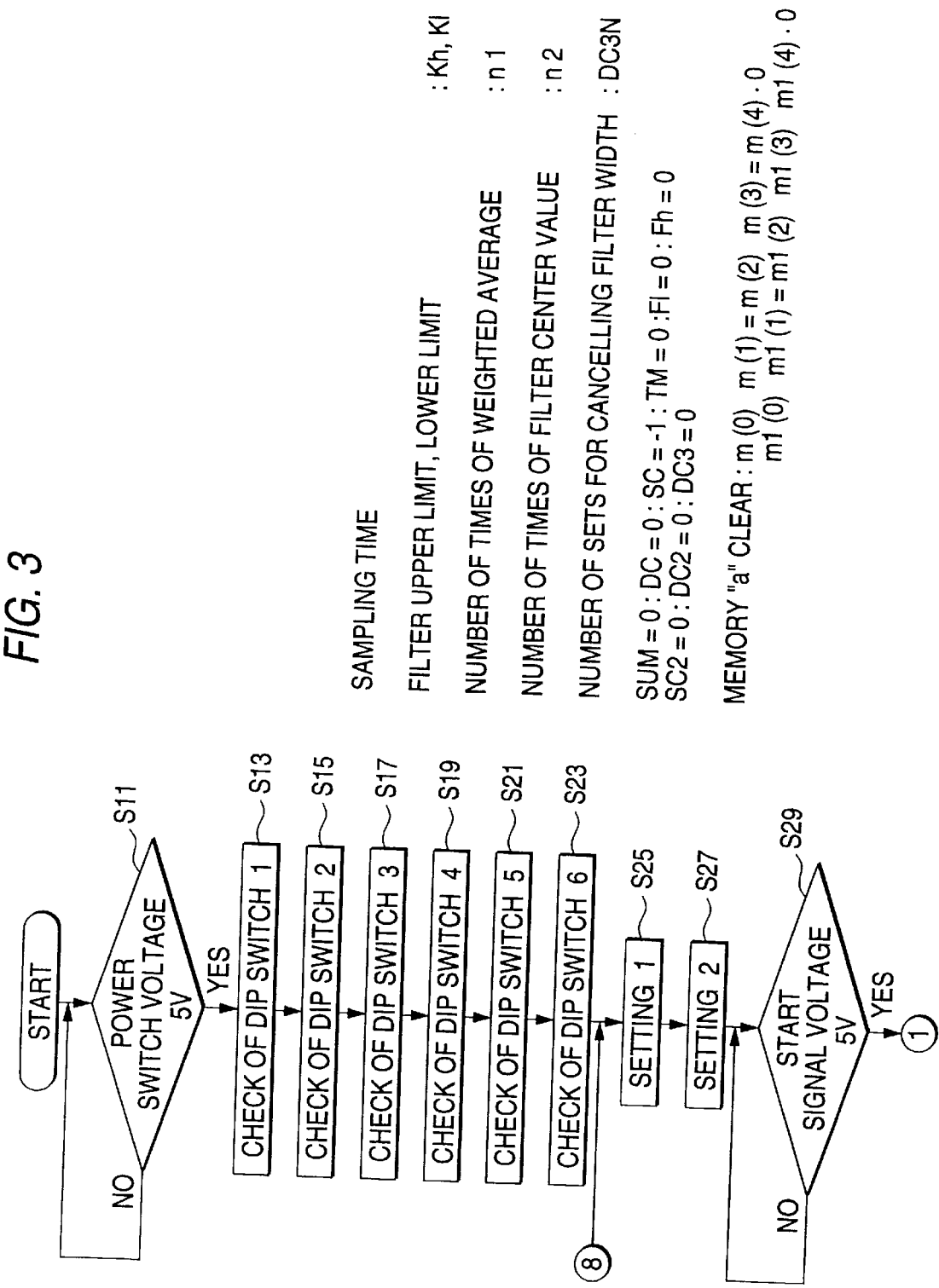
FIG. 3 is a flowchart of the details of the operation of the present invention.
Figure 4:
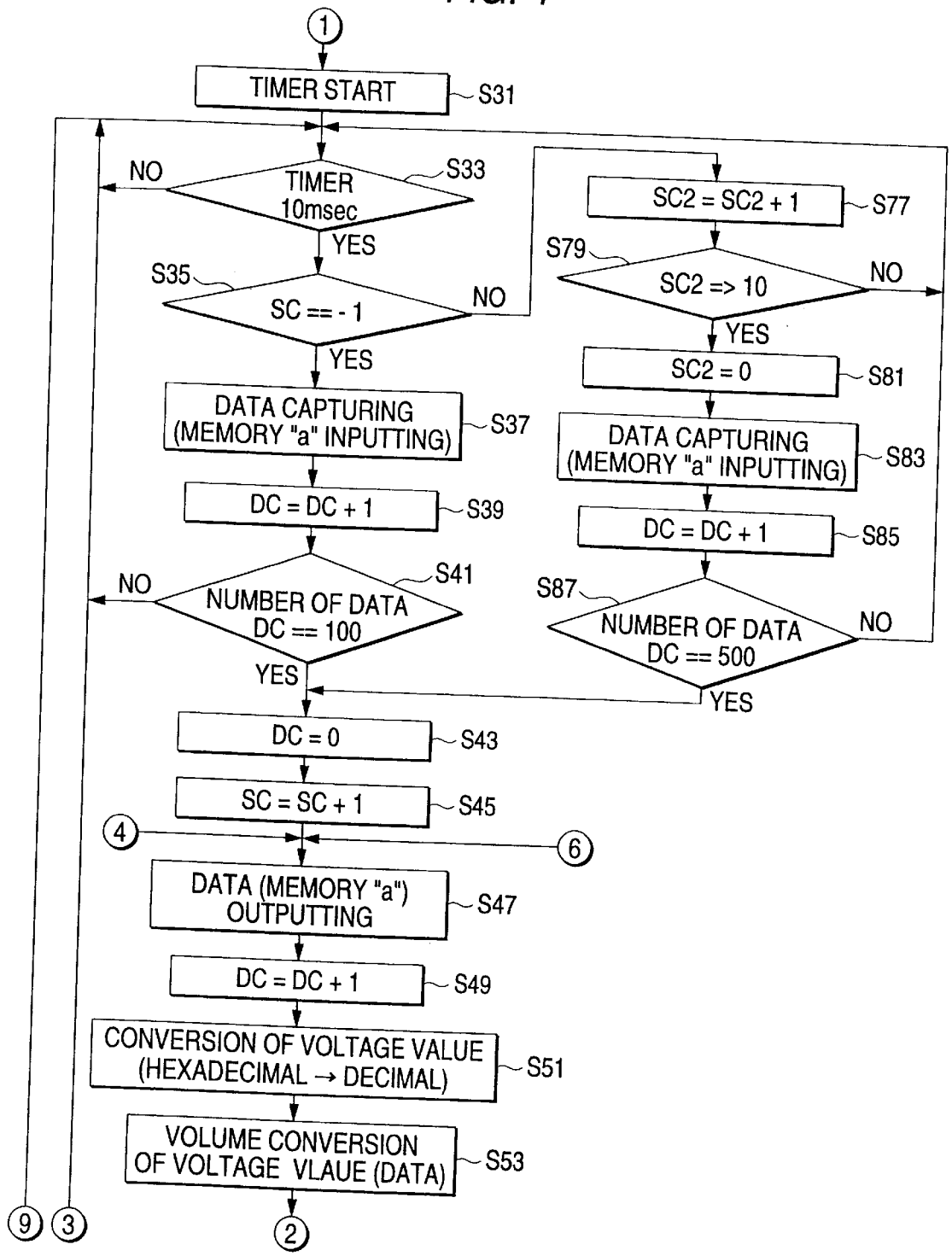
FIG. 4 is a flowchart of the details of the operation of the present invention.
Figure 5:
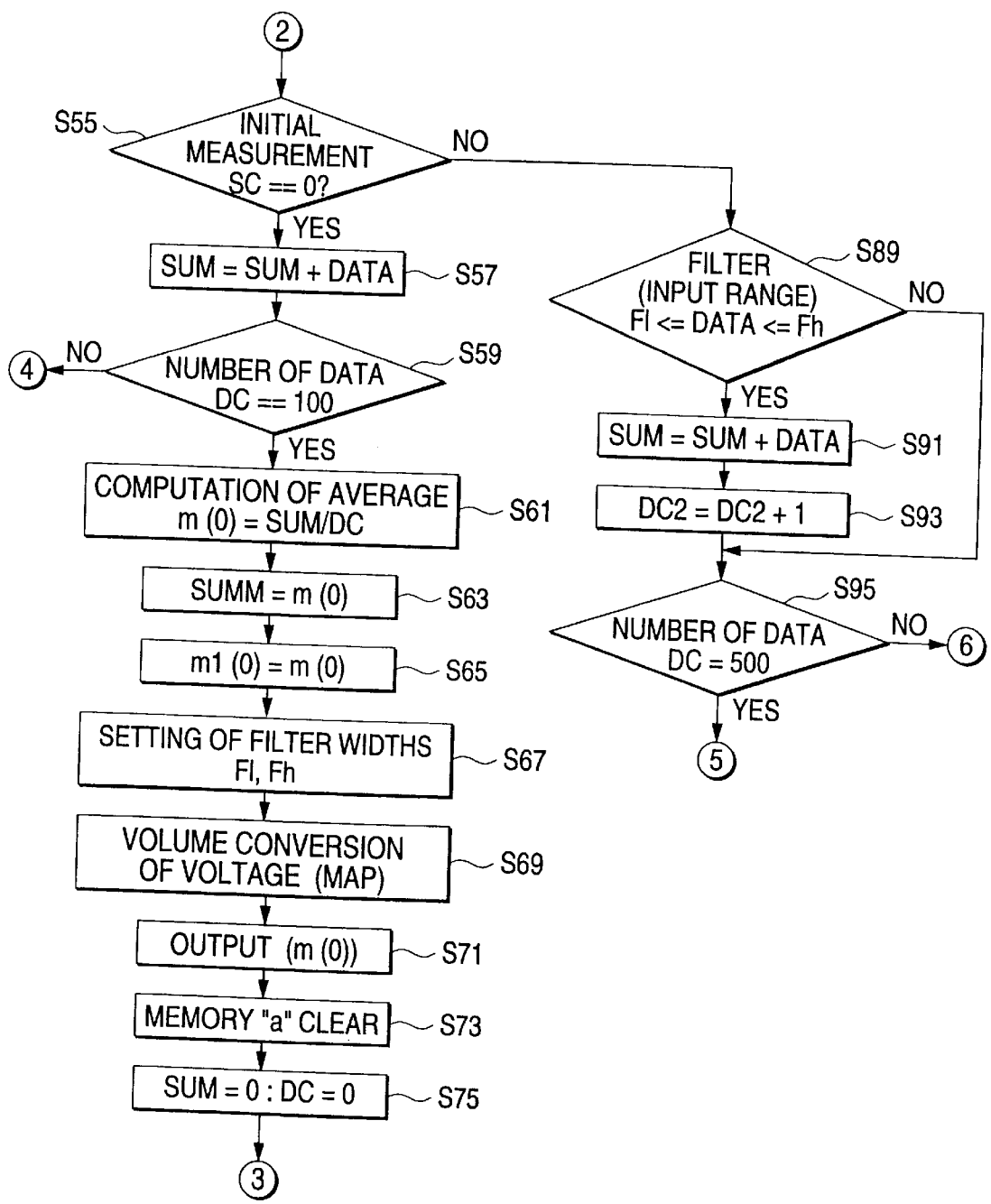
FIG. 5 is a flowchart of the details of the operation of the present invention.
Figure 6:
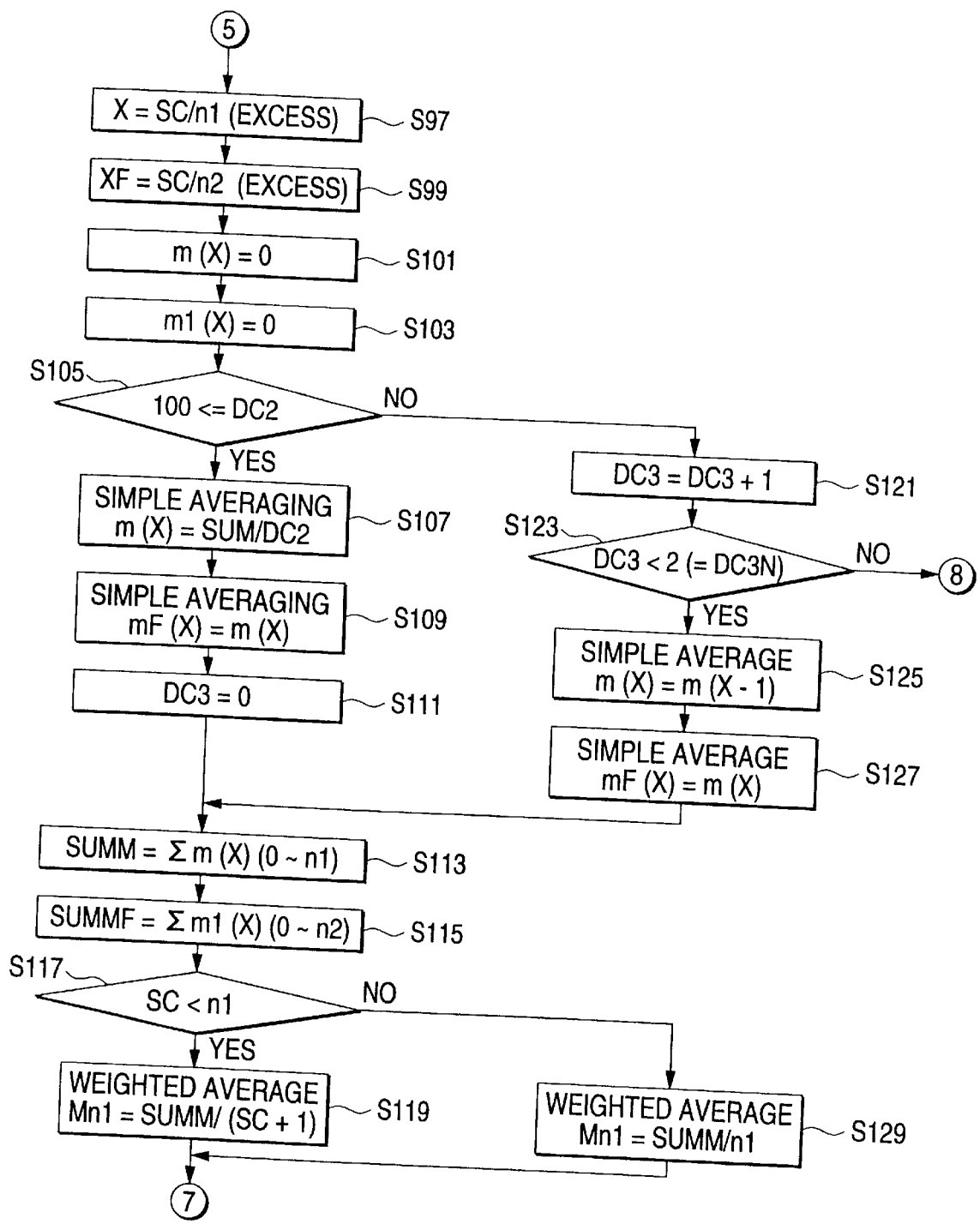
FIG. 6 is a flowchart of the details of the operation of the present invention.
Figure 7:
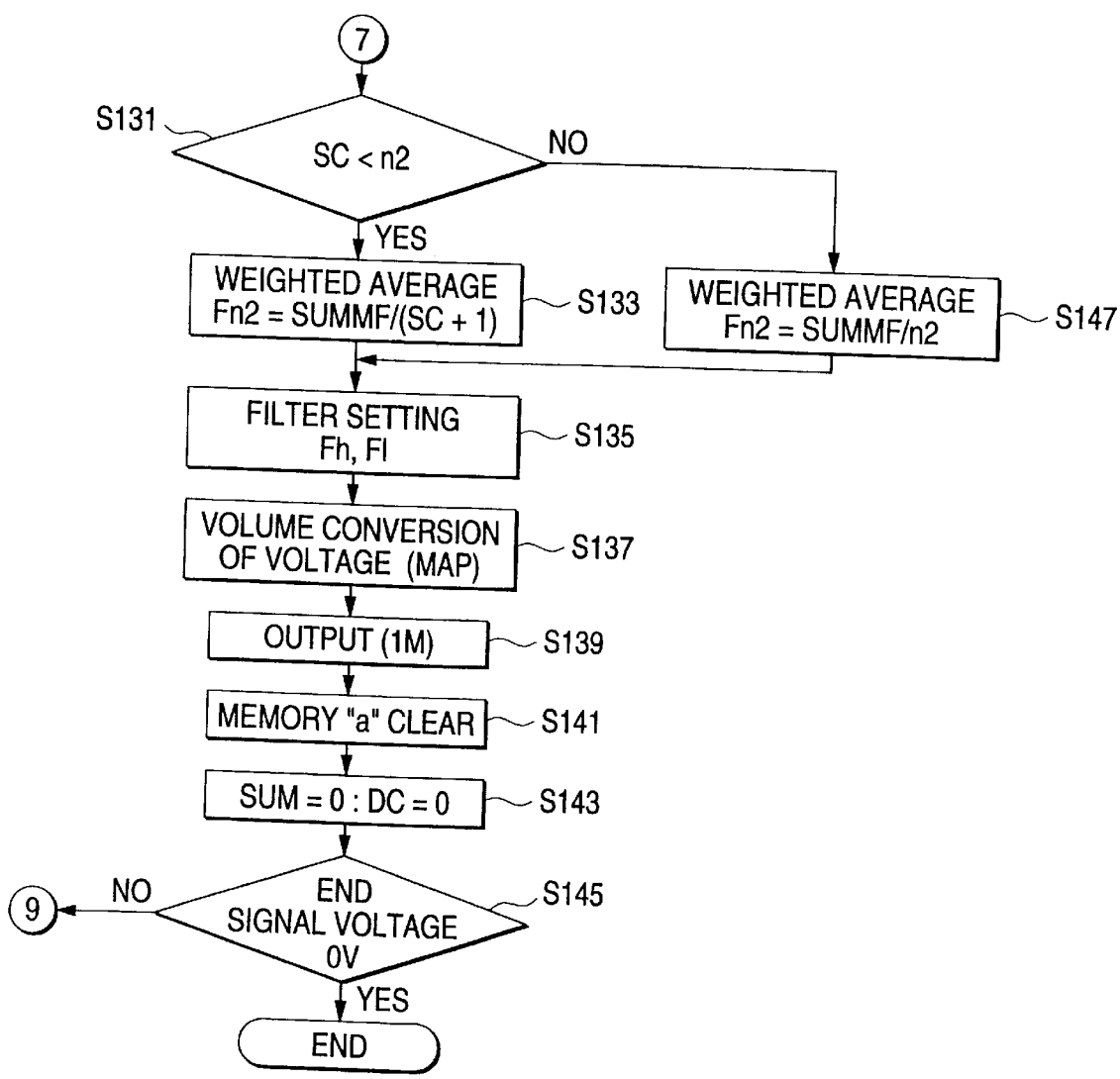
FIG. 7 is a flowchart of the details of the operation of the present invention.

As shown in FIG. 2, the processing program of the present invention includes four sub-flows of a parameter setting flow, an initial measuring flow, a normal measuring flow and a filter initializing flow. The schematic operation in each flow will be explained below.

The parameter setting flow in step S1, as initial setting, sets several kinds of parameter values necessary to measure a remaining fuel amount, and initializes the storage contents of the RAM 23. Namely, this flow sets a sampling time which is a period of capturing the remaining fuel amount data from the CPU 19, filter coefficients Kh and Kl defining the upper limit and lower limit of the abnormal value filter, number of time n1 of the weighted average, number of times n2 of the filter center value and number of times of resetting DC3N which is a decision criterion on whether or not the center value and range of the abnormal value filter should be reset, and also sets the contents of a memory "a" for an initial value. The several kinds of parameters or the contents of the memory "a" thus set will be used in the sub-flow such as the initial measurement flow described below. In the following description, an example will be explained in which the number of times n1 of the weighted average is set for "3", the number of times n2 of the filter central value is set for "2", and the number of times DC3N of resetting is set for "2". Even while the processing program is being executed, when a reset switch (not shown) is pushed to input a reset signal into the CPU 19, the processing program is interrupted to return to this parameter setting flow.

The initial measurement flow in step S3, in accordance with the input condition of remaining fuel amount data previously set in this initial measurement flow, captures 100 (one hundred) remaining fuel amount data into the CPU 19 for, e.g., a sampling time of 100 msec, and successively stores the data thus captured at prescribed addresses of the RAM 23. Further, the CPU 19 reads the remaining fuel amount data from the RAM 23 to compute the simple average of these data and successively stores the computing result at predetermined addresses of the RAM 23 as m(0) and mF(0). The CPU 19, referring to the conversion map read from the RAM 23, converts the voltage (computing result) into a fuel volume and transfers the remaining fuel amount after conversion to the fuel meter 25.

The CPU 19 sets the center value Fn2 and range of the abnormal filter which is applied to the normal measurement flow described below and removes the abnormal value as noise. The data mF(0) of the filter read from the RAM 23 is set as the central value Fn2 of the abnormal filter, while the upper limit Fh and lower limit Fl of the abnormal value filter are obtained by Equations (1) and (2), and the range is defined by the obtained values.

$$Fh = Fn2 \times Kh \tag{1}$$

$$Fl = Fn2 \times Kl \tag{2}$$

where Kh, Kl represent filter coefficient, respectively.

Incidentally, the initial measurement flow is generally used only during the initial measurement immediately after turn-on of the power source. However, when it is decided that center value and range of the abnormal filter should be set again, the processing is returned to this initial measurement flow.

In the normal measurement flow in step S5, the normal remaining fuel amount measurement is carried out. Since the number of times n1 of the weighted average is set for "3", the normal measurements at the first, second and third or et seq time will be explained separately.

In the first time normal measurement, in accordance with the inputting condition of the remaining fuel amount data previously set for the measurement flow, the CPU 19 captures 500 remaining fuel amount data as a block for a sampling time of e.g. 100 msec and successively stores the data thus captured at prescribed addresses of the RAM 23. The CPU 19 successively reads the remaining fuel amount data of one block from the RAM 23, applies the abnormal value filter, which has been set in the initial measurement flow, to the data thus read, eliminates the abnormal value data out of the set range, computes the simple average of the data selected as normal values, and successively stores the computing results at prescribed addresses of the RAM 23 as m(1) and mF(1). Incidentally, m(1) means the first simple average when three blocks corresponding to the set value of the number of times of the weighted average are used as a single lot and is used as the number of elements in acquiring the weighted average, while mF(1) means the first simple average when two blocks corresponding to the set value of the number of times of n2 of the filter central value are used as a single lot and is used as the number of elements in acquiring the filter central value Fn2. Further, as seen from FIG. 8, in the first time normal measurement, the CPU 19 captures the 500 remaining fuel amount data as a block, but as seen from FIG. 9, the abnormal data out of the set range are eliminated by application of the abnormal filter. Therefore, the number DC2 of data actually used is decreased from the number DC of data captured.

The CPU 19 computes the weighted average Mn1, as expressed in Equation (3), of the simple average data m(0) and m(1) read from the RAM 23, respectively, and stores the computing result Mn1 at a prescribed address of the RAM 23.

$$Mn1=\{(m(0)+m(1)\}/2 \quad (3)$$

On the other hand, referring to the conversion map read from RAM 23, the voltage of the computing result is converted into a fuel volume, and the remaining fuel amount after this conversion will be transferred to the fuel meter 25.

The CPU 19 sets the central value Fn2 and range of the abnormal filter, which will be applied to the second time abnormal measurement described later, in the same manner as in the initial measurement flow. The center value Fn2 of the filter is acquired from Equation (4) on the basis of the data mF(0) and mF(1) read from the RAM 23.

$$Fn2=\{mF(0)+mF(1)\}/2 \quad (4)$$

In the second time normal measurement, the CPU 19 captures the same number of remaining fuel amount data for the same sampling time as in the first time normal measurement and successively stores the captured data of one block at prescribed addresses in the RAM 23. The CPU 19 successively reads the remaining fuel amount data of one block from the RAM 23, applies the abnormal value filter, which has been set in the initial measurement flow, to the data thus read, eliminates the abnormal value data out of the set range, computes the simple average of the data selected as normal values, and successively stores the computed results at prescribed addresses of the RAM 23 as m(2) and mF(2). The CPU 19 computes the weighted average Mn2, as expressed in Equation (5), of the simple average data m(0), m(1) and m(2) read from the RAM 23, respectively, and stores the computing result Mn2 at a prescribed address of the RAM 23.

$$Mn2=\{(m(0)+m(1)+m(2)\}/3 \quad (5)$$

On the other hand, referring to the conversion map read from RAM 23, the voltage of the computing result is converted into a fuel volume, and the remaining fuel amount after this conversion will be transferred to the fuel meter 25.

Also, the CPU 19 sets the central value Fn2 and range of the abnormal filter, which will be applied to the third time abnormal measurement described later, in the same manner as in the initial measurement flow. The center value Fn2 of the filter is acquired from Equation (6) on the basis of the data mF(0) and mF(1) read from the RAM 23.

$$Fn2=\{mF(1)+mF(0)\}/2 \quad (6)$$

In the third time et seq. normal measurement, the CPU 19 captures the same number of remaining fuel amount data as a block for the same sampling time as in the first time normal measurement and successively stores the captured data of one block at prescribed addresses in the RAM 23. The CPU 19 successively reads the captured remaining fuel amount data of one block from the RAM 23, applies the abnormal value filter, which has been set in the previous measurement flow, to the data thus read, eliminates the abnormal value data out of the set range, computes the simple average of the data selected as normal values, and successively stores the computed results at prescribed addresses of the RAM 23 as m(0) and mF(1). The CPU 19 computes the weighted average Mn2, as expressed in Equation (7), of the simple average data m(1), m(2) and m(0) read from the RAM 23, respectively, and stores the computing result Mn2 at a prescribed address of the RAM 23.

$$Mn2=\{(m(1)+m(2)+m(0)\}/3 \quad (7)$$

On the other hand, referring to the conversion map read from the RAM 23, the voltage of the computing result is converted into a fuel volume, and the remaining fuel amount after this conversion will be transferred to the fuel meter 25.

The CPU 19 sets the central value Fn2 and range of the abnormal filter, which will be applied to the subsequent abnormal measurement, in the same manner as in the initial measurement flow. The center value Fn2 of the filter is acquired from Equation (8) on the basis of the data mF(0) and mF(1) read from the RAM 23.

$$Fn2=\{mF(0)+mF(1)\}/2 \quad (8)$$

The normal measurement flow, in addition to the processing of abnormal value and remaining fuel amount outputting, executes the processing of number-of-times computing by acquiring the dispersion of the remaining fuel amount data in a newest block and on the basis of the dispersed data thus acquired, computing the number n1 of times of the weighted average and the number of times n2 of the filter center value in accordance with a table of condition setting 1 as shown in FIG. 2; and processing of filter setting by acquiring a variation tendency of remaining fuel amount by referring to the simple average of the newest block and that of the past plural blocks and on the basis of the variation tendency thus acquired, re-setting the upper limit Fh and lower limit Fl of the abnormal value filter to suitable values in accordance with a table of condition setting 2 as shown in FIG. 2.

In the processing of computing the number of times, if the dispersion of the remaining fuel amount data is large, i.e., the liquid face of fuel swings unstably, the number of times n1 of the weighted average and the number of times n2 of the filter center value are set to a large value so that the remaining fuel amount data are subjected to data processing for a relatively long time, thereby eliminating the measurement error for the remaining fuel amount and stabilizing the output for the remaining fuel amount for a short time. On the other hand, in the filter setting processing, it is decided that the vehicle is running on a slope if the variation in the remaining fuel amount has tendencies of monotonous increase and decrease, thereby re-setting the upper limit Fh and lower limit Fl of the abnormal remaining fuel amount to suitable values. Specifically, if the variation in the remaining fuel amount has a tendency of monotonous increase, it is decided that the vehicle is running on a rising slope, thereby setting the upper limit Fh of the abnormal filter to a larger value than usual. On the other hand, the variation in the remaining fuel amount has a tendency of monotonous decrease, it is decided that the vehicle is running on a falling slope, thereby setting the lower limit Fl of the abnormal filter to a larger value than usual. Thus, since the range of the abnormal value filter adapted to the running status is set so as to permit inclination in the remaining fuel amount data during the running on a slope, it is possible to prevent the abnormal filter from being initially set owing to an accidental running status.

In the normal measurement flow described above, although the CPU 19 captures a prescribed number of remaining fuel amount data as a block, the abnormal value data out of the set range are removed by application of the abnormal value filter so that the number DC2 of data actually used is smaller than the number DC of data captured. However, if the time changing rate of remaining fuel amount is large during e.g. running on a superhighway, the number of data DC2 actually used may be largely decreased from the number of data DC captured. In such a case, setting the abnormal filter by the normal routine may not give the setting value adapted to actual circumstances.

In order to obviate such an inconvenience, in the filter initializing flow in step S7, if the number of data DC2 actually used in a certain normal measurement is smaller than a prescribed number of data (e.g. 100), the CPU 19 does not use the data captured at present, but continuously outputs the remaining fuel amount previously acquired as a present remaining fuel amount. However, if the above circumstances successively occur by the number of times DC3N of re-setting (e.g. twice), the CPU 19 initializes the setting value of the abnormal value filter to return to the initial measurement flow. In this way, if the setting value adapted to the actual circumstance has not be obtained by the setting of the abnormal value filter in the normal routine, the abnormal value filter is set again in the initial measurement flow, thereby correcting the setting value to a value adapted to the actual circumstance.

Now referring to FIGS. 3 to 7, the operation of a remaining fuel amount measuring apparatus for a fuel tank will be described in detail.

First, when an ignition switch for a vehicle (not shown) is turned on and voltage supply at a prescribed level such as 5 V (step S11) is confirmed, the CPU 19 initially sets various kinds of parameters required for measuring the remaining fuel amount and also initializes the storage contents of the RAM 23. Specifically, the CPU 19 checks the setting state of dip switches 1 to 6 to set a sampling time during which data of remaining fuel amount is captured through the CPU 19, filter coefficients Kh and Kl of defining the upper limit and lower limit of the abnormal value filter, the number of times n1 of the weighted average, the number of times n2 of the filter center value and the number of times DC3N of resetting which is a criterion on whether or not the central value and range of the abnormal value filter are set again, and also initializes the storage contents of various registers such as SUM, DC, SC, TM, Fl, Fh, SC2, DC2 and DC3 and memory "a" (steps S13 to S27). The various kinds of parameters, and the contents of the register and memory "a" will be used as occasion demands in the steps described below.

When a start signal is inputted from an I/O not shown and the voltage supply of a prescribed level of e.g. 5 V (step S29) is confirmed, the CPU 19 starts the recording of a timer set for e.g. 10 msec on the input condition of data of remaining fuel amount prescribed for the initial measurement flow. When a predetermined time elapses (steps S31, S33), it is decided whether or not the storage contents of the register SC for storing the number of times of accumulative measurement is an initial value "−1", i.e. whether or not the present measurement is an initial measurement (step S35). As a result of judgement in step S35, if the present measurement is an initial measurement, the processing is advanced to step S37. It not, the processing is advanced to step S77.

When it is decided in step S35 that the present measurement is an initial measurement, the CPU 19 executes the following measurement flow. Specifically, the CPU 19 captures the remaining fuel amount data to store the captured data at predetermined addresses of the RAM 23 and also adds one to the storage contents of the register DC for storing the number of data captured (steps S37 to S39). The CPU 19, based on the input condition of data of remaining fuel amount prescribed for the initial measurement flow, decides whether or not the number of data captured for the initial measurement has attained a setting value, e.g. 100 (step S41). As a result of judgement of step S41, if the number of captured data has not attained the setting value, the processing is returned to step S33 to capture the remaining fuel amount data for a prescribed sampling time until the number of captured data attains the predetermined value. If the number of captured data attains the setting value, the processing is advanced to step S43.

On the other hand, when it is decided in step S35 that the present measurement is not an initial measurement, the CPU 19 executes the following normal measurement flow. Specifically, the CPU 19 decides whether a prescribed sampling time set for e.g. 100 msec in the normal measurement flow has elapsed (steps S77 to S81), and the CPU 19 captures the remaining fuel amount data for a prescribed sampling time to store the captured data at predetermined addresses of the RAM 23 and also adds one to the storage contents of the register DC for storing the number of data captured (steps S83 to S85). The CPU 19, based on the input condition of data of remaining fuel amount prescribed for the initial measurement flow, decides whether or not the number of data captured for the initial measurement has attained a setting value, e.g. 500 (step S87). As a result of judgement of step S87, if the number of captured data has not attained the setting value, the processing is returned to step S33 to capture the remaining fuel amount data for a prescribed sampling time until the number of captured data attains the predetermined value. If the number of captured data attains the setting value, the processing to step S33 is advanced to step S43.

When it is decided in step S41 or S87 that the number of captured data attains the setting value, the CPU 19 initializes the storage contents of the register DC for storing the number of data captured, and adds one to the storage contents of the register SC for storing the number of times of accumulative measurement (steps S43 to S45). The CPU 19 reads out the remaining fuel amount data from prescribed addresses of the RAM 23, adds one to the register DC for storing the number of data captured, converts the voltage data read of a hexadecimal code into that of a decimal code, and referring to the conversion map read from the RAM 23, converts the decimal voltage data into DATA of fuel volume (steps S47 to S53). Next, the CPU 19 decides whether or not "1" has been added to the storage contents of the register SC for storing the number of times of accumulative measurement, i.e., whether or not the present measurement is an initial measurement (step S55). If the present measurement is an initial measurement, the processing is advanced to step S57. It not, the processing is advanced to step S89.

When it is decided in step S55 that the present measurement is an initial measurement, the CPU 19 adds the fuel volume DATA acquired in step S53 to the storage contents of the remaining fuel amount accumulative register SUM for storing the accumulative value of the remaining fuel amount of one block thereby to update the storage contents, thereby deciding whether or not the number of data for the initial measurement, set for 100 in this embodiment, has attained the setting value (step S59). If the number of data has not attained the setting value, the processing is returned to step S47 to repeat the processing of reading the remaining fuel amount data until the number of read data attains the setting value to convert it into the remaining fuel volume DATA. If the number of data attains the setting value, the processing is returned to step S61. In step S61, the CPU 19 computes the average of 100 pieces of accumulative values of remaining fuel amount for each block in the initial measurement. The CPU 19 stores the computing result m(0) in a register SUMM for accumulatively storing the average of the remaining fuel amount and also stores it at a predetermined address of the RAM 23 as data mF(0) used in defining the central value Fn2 and range of the abnormal filter (steps S61 to S65).

The CPU 19, referring to the data mF(0), computes the central value Fn2 of the abnormal value filter and the range defined by the upper limit Fh and lower limit Fl to set the abnormal filter to a desired value and also referring to the conversion map read from the RAM 23, converts the computing result m(0) in step S61 into the fuel volume which is transferred to the fuel meter 25 (step S67 to S71). The CPU 19 initializes the storage contents of the memory "a" and set the storage contents of the registers SUM and DC to zero. Thereafter, the CPU 19 returns the processing to repeat the predetermined steps (step S75).

On the other hand, if it is decided in step S55 that the present measurement is not the initial measurement, the CPU 19 executes the following normal flow. Specifically, the CPU 19 decides whether or not the fuel volume DATA acquired by step S53 is within a preset range of the abnormal filter (step S89).

If the fuel volume DATA is within the preset range of the abnormal filter (step S89), i.e., regarded as being normal, the processing is advanced to next step S91. The CPU 19 adds the present fuel volume DATA to the storage contents of the register SUM to update the storage contents, and adds one to the storage contents of a register DC2 for storing the number of fuel volume DATA regarded as being normal (steps S91 to S93). On the other hand, if the fuel volume DATA is out of the preset range of the abnormal filter (step S89), i.e., regarded as being abnormal, the processing from step S91 to S93 are jumped to advance to the subsequent step S95. In step S95, the CPU 19 decides whether or not the number of data read in the normal measurement has attained the setting value (step S95). If the number of data has not attained the setting value, the processing is returned to step S47 to repeat the processing of reading the remaining fuel amount data until the number of read data attains the setting value to convert it into the remaining fuel volume DATA. If the number of data attains the setting value, the processing is advanced to step S97.

In step S97, the CPU 19 divides the storage contents of the accumulative measuring number of times register SC by the number of times n1 of the weighted average to store a resultant excess at a prescribed address of the RAM 23 as data X, and also divides the storage contents of the register SC by the number of times n2 of the filter center value to store a resultant excess at a prescribed address of the RAM 23 as data XF (steps S97 to S99). The data X and XF acquired by steps S97 to S99 will be used to decide at which order the present accumulative measuring number of times are located in the respective setting times of the number of times n1 of the weighted average and the number of times n2 of the filter center value. The CPU 19 cancels the data in the normal measurement of the previous X-th measurement in storing the simple average in the present X-th normal measurement as data m(X) and mF(X) at prescribed addresses of the RAM 23, respectively (steps S101 to S103), and decides whether or not the storage contents of the normal data number register DC2 is 100 or more, i.e., the number of data DC2 actually used during the present X-th normal measurement is the prescribed number of data, e.g. 100 or more (step S105).

When it is decided in step S105 that the number of data DC2 actually used is not smaller than 100, the CPU 19 stores the simple average in the present X-th normal measurement as the data m(X) and mF(X) at prescribed addresses of the RAM 23, respectively, and set 0 (zero) for the storage contents of the abnormal accumulative number-of-times register DC3 for storing the accumulative number of times when the storage contents of the normal data number register DC2 have becomes 100 or less (step S107) to proceed to the subsequent step S113.

On the other hand, it is decided in step S105 that the number of data DC 2 has not attained 100, the CPU 19 adds "1" to the storage contents of the register DC3 to determine whether or not the storage contents of the register DC3 have attained a resetting number of times DC3N (=2) (steps S121 to S123). When it is decided in step S123 that the storage contents of the register DC3 have not attained the resetting number of times DC3N, the CPU 19 stores, not the data captured in the present block but the simple average acquired in the previous block as the data m(X) and mF(X) at prescribed addresses of the RAM 23, respectively (steps S125 to S127) to proceed the subsequent step S113.

In step S113, the CPU 19 computes the accumulative value of the simple average of the plural blocks with an upper limit of the number of times n1 of the weighted average, which is the number of elements in acquiring the weighted average, and stores the computing result in a remaining fuel amount average accumulative register SUMM. The CPU 19 also computes the accumulative value of the simple average of the plural blocks with an upper limit of the number of times n2 of the weighted average, which is the number of elements in acquiring the weighted average, and stores the computing result in a remaining fuel amount average accumulative register SUMF (step S113 to S115). The CPU 19 decides whether or not the storage contents of the register SC have attained the set value (=3) of the number of times n1 of the weighted average, i.e., the average parameter of the weighted average can be set for n1 (step S117). When it is decided in step S117 that the storage contents of the register SC have not attained the number of times n1 of the weighted average, the CPU 19 computes the weighted average using the number obtained by adding "1" to the storage contents of the register SC as a parameter and stores the computing result as data Mn1 at a prescribed address of the RAM 23. When it is decided in step S117 that the storage contents of the register SC have attained the number of times n1 of the weighted average, the CPU 19 computes the weighted average using the number of times n1 of the weighted average as a parameter and stores the computing result as data Mn1 at a prescribed address of the RAM 23 (step S119 to S129). The weighted average Mn1 thus acquired is converted into the remaining fuel amount to be outputted in the processing step described later.

In steps S119 to S129, when the weighted average Mn1 is acquired, the CPU 19 decides whether or not the storage contents of the register SC have attained the setting number of times n2 (=2) of the filter center value, i.e., whether or not the average parameter of the weighted average can be set for n2 (step S131). When it is decided in step S131 that the storage contents of the register SC has not attained the number of times n2 of the filter center value, the CPU 19 computes the weighted average using the number resulting from addition of "1" to the register SC as a parameter and stores the computing result as data Fn2 at a prescribed address of the RAM 23. When it is decided that the storage contents of the register SC have attained the number of times n2 of the filter center value, the CPU 19 computes the weighted average using the number of times n2 of the filter center value as a parameter and stores the computing result as data Fn2 at a prescribed address of the RAM 23 (steps S133 to S147). The weighted average Fn2 thus acquired is adopted as the filter center value which will be used to set the filter in the subsequent step.

When the weighted average Fn2 is acquired in step S133 to S147, the CPU 19 executes the filter setting processing of setting the upper limit or lower limit of the abnormal value filter as a suitable value, and converts the weighted average Mn1 into a remaining fuel amount. The remaining fuel amount TM thus acquired is transferred to the fuel meter 25 (steps S135 to S139). Further, the CPU 19 initializes the storage contents of the memory "a" and sets the storage contents of the remaining fuel amount register SUM and the captured data number register DC to 0 (zero). Thereafter, when a completion signal is supplied from the I/O, the CPU 19 decides whether or not supplied voltage has become 0 (zero). As a result of this processing, when it is decided that the processing should be continued, the processing process is returned to step S33 to repeat predetermined processing steps. When it is decided that the processing has ended, all the processing steps will be ended (steps S141 to S145).

In the embodiments described above, the liquid face of fuel has been detected using a float. The present invention, however, can be applied to the remaining fuel amount measuring apparatus in any manner of detecting the liquid face such as using an ultrasonic sensor.

It is needless to say that the present invention can be applied to the fuel tank which intends to prevent dispersion of fuel vapor.

Finally, in the embodiments described above, as a fuel tank in the remaining fuel amount measuring apparatus according to the present invention, the fuel tank of a motor vehicle equipped with an internal combustion engine was illustrated. The present invention, however, should not be limited to such a fuel tank, but can be applied to a wide field of applications inclusive of the fuel tank of an aircraft with an internal combustion engine, agricultural implements such as a tractor equipped with an internal combustion engine, etc.

As described above, in accordance with the invention of the first aspect, since the weighted average acquired by further averaging the simple averages of a plurality of blocks inclusive of the newest block and a past block is converted into a remaining fuel amount to be outputted, even when a case occurs where acceleration is applied to the fuel tank to swing the face of a fuel liquid, the remaining fuel amount data subjected to averaging twice is converged into a value representative of the actual remaining fuel amount. As a result, the measuring error of the remaining fuel amount can be greatly suppressed to permit the remaining fuel amount in the fuel tank to be measured with high accuracy.

In accordance with the invention of the second aspect, since the remaining fuel amount data are subjected to the data processing of simple averaging and weighted averaging based on the data after abnormal data has been removed from the respective block data, the remaining fuel amount can be acquired with higher accuracy than in the invention of the first aspect.

In accordance with the invention of the third aspect, since the remaining fuel amount data are subjected to the data processing of simple averaging on the basis of the data with the abnormal data excluded from each block data and the simple average for the newest block is converted into a remaining fuel amount to be outputted, even when a case occurs where acceleration is applied to the fuel tank to swing the face of a fuel liquid, the remaining fuel amount data acquired by simple averaging of the data with the abnormal data excluded, without being subjected to weighted averaging, is converged into a value representative of the actual remaining fuel amount. As a result, the measuring error of the remaining fuel amount can be greatly suppressed to permit the remaining fuel amount in the fuel tank to be measured with high accuracy.

In accordance with the invention of the fourth aspect, since the range adapted to the inclined state of the fuel tank can be set so as to permit unbalance in the remaining fuel amount data when the fuel tank inclines, the abrupt reduction in the number of the remaining fuel amount data which are used in acquiring the simple average or weighted average and from which the abnormal data are excluded, owing to accidental inclination of the fuel tank, can be prevented. As result, a case can be avoided where the remaining fuel amount cannot be measured owing to extreme reduction in the number of remaining fuel amount data, thereby acquiring the stabilized remaining fuel amount successively.

In accordance with the invention of the fifth aspect, using the number of times of the weighted averages computed on the basis of the dispersion of the newest block data, i.e., using the number of times of the weighted averages which is set to a large value if the liquid face of fuel swings unstably, and is set to a small value if the liquid face of fuel is stable, the weighted average is computed on the remaining fuel amount data having a time width suitably adjusted to correspond to the state of the liquid face. Namely, if the fuel liquid face swings unstably, the remaining fuel amount is acquired on the basis of the remaining fuel amount data during a relatively long time width, and if the fuel liquid face is stable, the remaining fuel amount is acquired on the basis of the remaining fuel amount data during a relatively short time width. Thus, the remaining fuel amount acquired is swiftly converged into a value correctly representing an actual remaining fuel amount. As a result, the measuring error of the remaining fuel amount can be greatly suppressed to permit the remaining fuel amount in the fuel tank to be measured with high accuracy.

What is claimed is:

1. A remaining fuel amount measuring apparatus for a fuel tank, comprising:
   detecting means for detecting an amount of fuel remaining in the fuel tank to output remaining fuel amount data;
   block data storage means for capturing the remaining fuel amount data outputted from said detecting means at prescribed periods and compiling the captured remaining fuel amount data into blocks each composed of a prescribed number of data to be successively stored;
   simple average computing means for computing a simple average for each block on the basis of the block data stored in said block data storage means;
   weighted average computing means for computing a weighted average by further averaging the simple averages of a plurality of blocks on the basis of the simple average for a newest block and that for at least one past block computed by said simple average computing means; and
   remaining fuel amount outputting means for converting the weighted average computed by said weighted average computing means into a remaining fuel amount to be outputted.

2. A remaining fuel amount measuring apparatus for a fuel tank according to claim 1, further comprising:
   abnormal value range computing means for computing a range to exclude abnormal value data from said captured remaining fuel amount data on the basis of past remaining fuel amount data;
   abnormal value removing means for removing the abnormal data from each block data stored in said block data storage means on the basis of the range computed by said abnormal value range computing means;
   wherein said simple average computing means computes the simple average for each block on the basis of each block data with the abnormal value data removed by said abnormal value removing means.

3. A remaining fuel amount measuring apparatus for a fuel tank, comprising:
   detecting means for detecting an amount of fuel remaining in the fuel tank to output remaining fuel amount data;
   block data storage means for capturing the remaining fuel amount data outputted from said detecting means at prescribed periods and compiling the captured remaining fuel amount data into blocks each composed of prescribed number of data to be successively stored;
   abnormal value range computing means for computing a range to exclude abnormal value data from said captured remaining fuel amount data on the basis of a past remaining fuel amount data;
   abnormal value removing means for removing the abnormal data from each block data stored in said block data storage means on the basis of the range computed by said abnormal value range computing means;
   simple average computing means for computing a simple average for each block on the basis of each block data with the abnormal value data removed by said abnormal value removing means; and
   remaining fuel amount outputting means for converting the simple average for a newest block computed by said simple average computing means into a remaining fuel amount to be outputted.

4. A remaining fuel amount measuring apparatus for a fuel tank according to claim 2, further comprising:
   variation tendency computing means for computing a variation tendency of the simple average among a plurality of blocks on the basis of the simple average for the newest block and that for at least one past block computed by said simple average computing means,
   wherein said abnormal range computing means computes the range to exclude the abnormal value data from said captured remaining fuel amount on the basis of the variation tendency computed by said variation tendency computing means.

5. A remaining fuel amount measuring apparatus for a fuel tank according to claim 3, further comprising:
   variation tendency computing means for computing a variation tendency of the simple average among a plurality of blocks on the basis of the simple average for the newest block and that for at least one past block computed by said simple average computing means,
   wherein said abnormal range computing means computes the range to exclude the abnormal value data from said captured remaining fuel amount on the basis of the variation tendency computed by said variation tendency computing means.

6. A remaining fuel amount measuring apparatus for a fuel tank, comprising:
   detecting means for detecting an amount of fuel remaining in the fuel tank to output remaining fuel amount data;
   block data storage means for capturing the remaining fuel amount data outputted from said detecting means at prescribed periods and compiling the captured remaining fuel amount data into blocks each composed of a prescribed number of data to be successively stored;
   simple average computing means for computing a simple average for each block on the basis of the block data stored in said block data-storage means;
   dispersion computing means for computing a dispersion of a newest block data on the basis of newest block data stored in said block data storage means;
   number-of-times computing means for computing number-of-times of a weighted average, the number-of-times constituting a parameter of the weighted average which is computed by further averaging the simple averages of a plurality of blocks on the basis of the dispersion of the newest block computed by the dispersion computing means;
   weighted average computing means for computing the weighted average with the parameter of the number-of-times computed by the number-of-times computing means, on the basis of the simple average for the newest block and that for at least one past block computed by said simple average computing means; and
   remaining fuel amount outputting means for converting the weighted average computed by said weighted average computing means into a remaining fuel amount to be outputted.

7. A remaining fuel amount measuring apparatus for a fuel tank according to claim 1, wherein when said block data storage means captures less than said prescribed number of data in a particular prescribed period, said apparatus uses a previously determined simple average as a backup simple average for said particular prescribed period.

* * * * *